US011560228B2

(12) United States Patent
Pernechele et al.

(10) Patent No.: US 11,560,228 B2
(45) Date of Patent: Jan. 24, 2023

(54) RESTRAIN AND RELEASE MECHANISM FOR AN EXTERNALLY AIRBORNE LOAD

(71) Applicant: AEREA S.p.A., Turate (IT)

(72) Inventors: Luca Andrea Pernechele, Sesto San Giovanni (IT); Dario Guffanti, Arese (IT)

(73) Assignee: AEREA S.p.A., Turate (IT)

( * ) Notice: Subject to any disclaimer, the term of this patent is extended or adjusted under 35 U.S.C. 154(b) by 117 days.

(21) Appl. No.: 16/599,572

(22) Filed: Oct. 11, 2019

(65) Prior Publication Data

US 2020/0115051 A1   Apr. 16, 2020

(30) Foreign Application Priority Data

Oct. 12, 2018  (IT) .......................... 102018000009411
Oct. 7, 2019   (EP) ...................................... 19201628

(51) Int. Cl.
  *B64D 1/06*   (2006.01)
  *B64D 7/00*   (2006.01)
(52) U.S. Cl.
  CPC .................. *B64D 1/06* (2013.01); *B64D 7/00* (2013.01)
(58) Field of Classification Search
  CPC ..................................... B64D 1/06; B64D 7/00
  See application file for complete search history.

(56) References Cited

U.S. PATENT DOCUMENTS

| 2,461,406 | A |   | 2/1949  | Birk et al. |       |
|-----------|---|---|---------|-------------|-------|
| 3,611,865 | A | * | 10/1971 | Schallert   | B64D 1/06 |
|           |   |   |         |             | 89/1.51 |
| 3,670,620 | A |   | 6/1972  | Paraskewlk  |       |
| 3,983,784 | A |   | 10/1976 | Maughlin    |       |
| 4,233,883 | A | * | 11/1980 | Miko        | B64D 1/06 |
|           |   |   |         |             | 244/137.4 |
| 4,448,373 | A | * | 5/1984  | Bates       | B64D 7/08 |
|           |   |   |         |             | 244/137.4 |
| 5,988,567 | A | * | 11/1999 | Wille       | B64D 7/00 |
|           |   |   |         |             | 244/118.1 |
| 7,677,501 | B1 |  | 3/2010  | Hundley     |       |
| 2006/0108478 | A1 | | 5/2006  | Bajuyo      |       |
| 2017/0368608 | A1 | * | 12/2017 | Homma    | B33Y 80/00 |

FOREIGN PATENT DOCUMENTS

EP        3309544 A1    4/2018

OTHER PUBLICATIONS

Italian Search Report and Written Opinion dated May 21, 2019.

* cited by examiner

*Primary Examiner* — Christopher D Hutchens
(74) *Attorney, Agent, or Firm* — Heslin Rothenberg Farley & Mesiti P.C.; Victor A. Cardona, Esq.

(57) ABSTRACT

A restrain and release mechanism for an externally airborne load, includes at least one stiff support for suspending the load and an elastically deformable adaptive member designed to maintain the load at pressure contact against the support. The adaptive member is a three-dimensional monolithic metallic body obtained using an additive manufacturing method and having a flexural orthotropic behaviour.

14 Claims, 3 Drawing Sheets

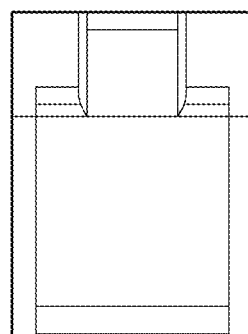
FIG. 1
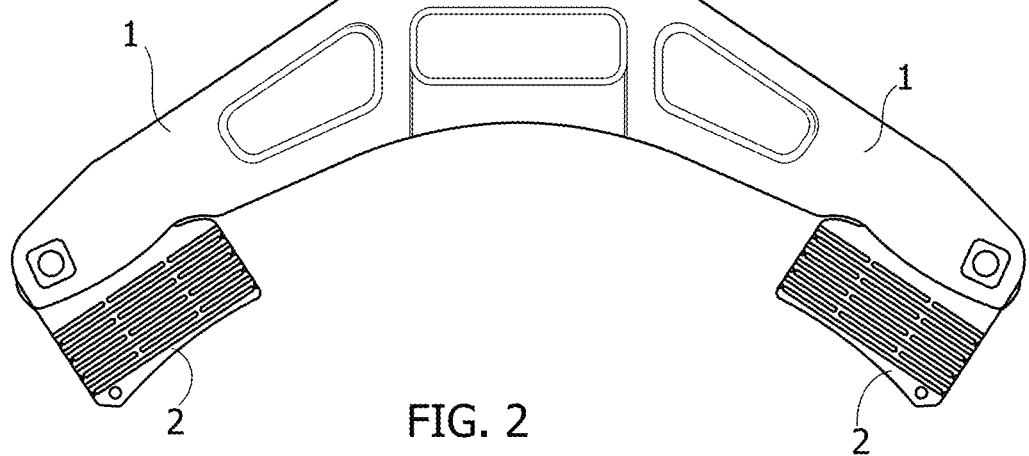
FIG. 2
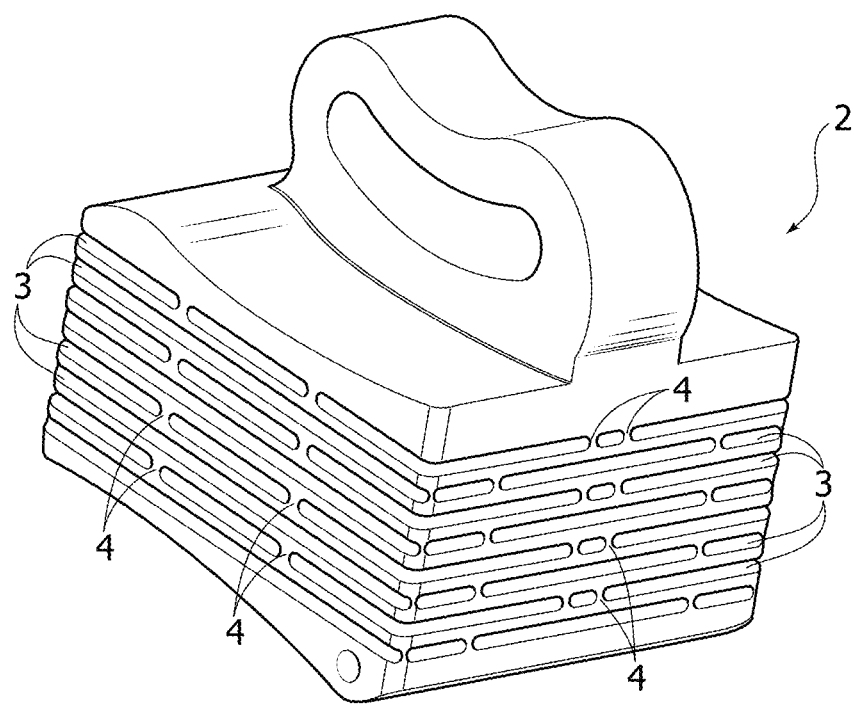

RESTRAIN AND RELEASE MECHANISM FOR AN EXTERNALLY AIRBORNE LOAD

CROSS REFERENCE TO RELATED APPLICATIONS

This application claims priority from European Patent Application No. 19201628.5 filed Oct. 7, 2019 and Italian Patent Application No. 102018000009411 filed on Oct. 12, 2018, the entire disclosures of which are incorporated herein by reference.

FIELD OF THE INVENTION

The present invention generally regards restrain and release systems for airborne loads (BRU, Bomb Rack Unit) which are used in the aeronautical and aerospace industries for constraining an external load to the structure of the aircraft (carriage), releasing it and thus safely releasing it upon the pilot's command (release or jettison).

STATE OF THE PRIOR ART

According to the military standards in force (e.g. MIL-STD-8591) external loads (stores) are constrained using a pair of bail lugs and four surfaces on which an equal number of structural components serving as swivelling pads lie. During the flight it is important that the BRU guarantees the absence of relative motion between the external load and the structure of the aircraft, so as to prevent phenomena related to impacts and/or over-stresses. This condition is obtained by introducing a predetermined preload between the bail lugs and the aforementioned areas. Such preload is specific for each BRU and it is basically applied using two different methods:

- By lifting the bail lugs against the swivelling pads which remain integrally joined with the structure of the aircraft;
- By lowering the swivelling pads against the bail lugs, which remain integrally joined with the structure of the aircraft;
- By screwing suitable adapters at the ends of the pads, with solutions of the swaybrace claw type.

All the three design solutions mentioned above require the use of elements characterised by high stiffness and structural resistance, so as to support both the initial preload and the constraint reactions exchanged by the swivelling pads and the bail lugs with the external load over the entire flight envelope. Such stiffness determines a dynamic coupling up to the high frequencies between the BRU and the external load, with possible vibration criticalities. However, the preload intended to be positioned the highest possible to avoid detachments must be calibrated as a function of the resonance frequencies determined by the inertial and dynamic interactions between the Bomb Rack and the external load.

A further observation regards possible geometric asymmetries of the airborne load (dimensional and shape tolerances), that could cause considerable reaction deformity on the four contact points (swivelling pads), both due to the total force value exchanged and due to the actually acting specific pressure, which is a function of the minimum guaranteed contact area.

Considering the two design theories mentioned above, the systems described below are currently used.

Liftable Hitch System (Roto-Translatable Subjects) and Fixed Pads

They guarantee load positioning repeatability with minimum alignment errors, given that the swivelling pads always remain integrally joined with the structure of the aircraft. This solution is deemed the most sensitive to form errors and thus the one that guarantees least preload and contact pressure uniformity. It is generally used for Bomb Racks designed for helicopters or aircraft with flight envelopes having limited maximum acceleration values.

Translating Pad and Rotary Hitch System

This is a solution that is particularly stiff and structurally suitable to bear high flight loads. The displacement system can be actuated from a single operating point or from two independent operating points. Being a very stiff system, if the reactions in flight exceed the applied preload value, there could be detachments between the contact surfaces with the ensuing impact-related events, even though with very few displacements. It should be observed that the contact area is ideally provided on a line (in tangency) and not on a nominal contact area.

Swivelling Pad System

Though this solution, generally of the swaybrace claw type, for instance such as disclosed in U.S. Pat. No. 7,677,501, which offers a contact surface that is more easily adaptable to the back of the suspended external load. When installing the external load, one has to act on all four operating points, entailing the risk of applying reactions with different value for each point of contact and thus generating asymmetries as concerns the orientation of the suspended load. This determines poor alignment repeatability. Even the duration of the installation over time is obviously greater than in the two previous solutions.

SUMMARY OF THE INVENTION

The object of the present invention is to combine the inherent adaptation capacity of the swaybrace claw type with swivelling pads, together with the alignment repeatability, simplicity and rapidity of use of the rigid pad systems. More in particular, given that any inadvertent detachment of the load could arise from almost static stresses (strenuous manoeuvres) and more frequently from medium/high frequency vibrations, the invention sets out to provide a restrain and release mechanism for an externally airborne load of the adaptive type, configured so as to allow a given degree of yieldability in the preload reaction direction, normally orthogonal to the contact surfaces, so as to ensure vibration isolation between the BRU and the airborne load, but without reducing the structural strength required to resist to the loads generated in the flight phase.

According to the invention, this object is attained thanks to a restrain and release mechanism for an externally airborne load, comprising at least one stiff support for suspending the load and an elastically deformable adaptive member designed to maintain the load at pressure contact against the support, characterised in that said adaptive member consists in a three-dimensional monolithic metallic body obtained using an additive manufacturing method.

The monolithic metallic body is conveniently provided with a flexural orthotropic behaviour and thus it has variable density and inertia along the sections thereof.

Preferably, the monolithic metallic body has an elastic bi-stable linear behaviour initially with low stiffness under initial deformation and subsequently with high stiffness.

In a preferred embodiment, the monolithic metallic body comprises a plurality of plate-like elements superimposed and interconnected by means of intermediate spacers oriented transversely to the plate-like elements and conveniently arranged asymmetrically.

Thanks to this solution idea, the restrain and release mechanism according to the invention is effectively capable of combining the inherent adaptation capacity of the swivelling pad with the alignment repeatability, simplicity and rapidity of use of the stiff swivelling pad systems. The structural characteristics of the monolithic metallic body allow the mechanism according to the invention to be "flexible" in the plane and "yieldable" in the orthogonal direction, guaranteeing—beyond a given compression value—a resistance suitable to bear the loads in all operating conditions. Such characteristics allow to combine a given degree of yieldability with a high structural strength, which are mutually opposite requirements. For example, a conventional spring can be designed stiff, envisaging to make it to operate in a close-wound fashion so as to obtain a double-stiffness behaviour. However, a conventionally-shaped elastic element cannot be conferred orthotropic bending stiffness, just like optimal contact surfaces cannot be obtained. Furthermore, as concerns a conventional spring, the ratio between stiffness and overall dimension would not be sufficiently high for the purposes and objectives of the invention.

The monolithic metallic body of the restrain and release mechanism according to the invention has a configuration such to be easy to install, it is structurally simple and thus extremely reliable. Furthermore, it can be deformed in the plane and in the orthogonal direction but, upon reaching the maximum compression thereof, it can bear higher loads without any permanent deformation. Furthermore, it is small in size, it is extremely light and the additive manufacturing method thereof makes the manufacturing thereof relatively simple and cost-effective.

Having to guarantee bending on both planes orthogonal to the loading direction, the structure of the monolithic metallic body is basically obtained by superimposing—in a layer-like fashion—two or more plate-like elements, mutually rotated by 90° with respect to the bending point and interconnected by intermediate spacer septa oriented transversely to the layers. Such intermediate spacers are normally arranged asymmetrically and so as to maintain the stress values within the elastic field, and thus avoid plastic deformations. Basically, each layer of the monolithic metallic body bends between the supports, until it comes into contact with the subsequent layer. Beyond a given threshold value, the layers act at direct contact and thus the structure behaves like a stiff element.

Dampers made of elastomeric material can be provided for between the plate-like elements, and the monolithic metallic body can consist of a central hole dimensioned to obtain a linear bending behaviour and allow the insertion of an elastomer should one intend to combine the flexibility of the metallic body with a high hysteresis behaviour, so as to guarantee a given damping degree too.

Similarly to the number of turns for the springs, increasing the number of layers allows to obtain a greater stroke prior to achieving a drastic change of stiffness. On the other hand, increasing the thickness of the layers allows to increase the initial stiffness and thus the functional load. Furthermore, providing layers of different thickness can allow to introduce variable stiffness areas with different frequencies thereof, and the asymmetrical orientation of the septa guarantees an optimised flexural orthotropic behaviour.

In conclusion, the monolithic metallic body according to the invention is thus capable of deforming not only following compression but also following rotations transversal to the load direction, nullifying possible misalignments or geometric irregularities and guaranteeing a uniform pressure on the entire surface designated for contact.

BRIEF DESCRIPTION OF THE DRAWINGS

Further characteristics of the invention will be apparent from the following detailed description, with reference to the attached drawings, provided by way of non-limiting example, wherein:

FIG. 1 is a front sectional schematic view of an example of a restrain and release mechanism obtained according to the invention, FIG. 2 is a perspective and larger scale view of the monolithic metallic element of the restrain and release mechanism according to the invention.

DETAILED DESCRIPTION OF THE INVENTION

As known, systems designed for airborne transportation of external loads for aircraft and aerospace vehicles must ensure the absence of relative motions between the loads in question and the support structure on which they are suspended, so as to prevent the occurrence of impact and/or over-stress-related events due to the application of accelerations simultaneously with one or more degrees of freedom allowed to the external load.

Typically, systems thus made comprise a swaybrace claw mechanism including a support having two pairs of stiff pad arms against each one of which the suspended load is kept under pressure contact by means of an elastically deformable element.

An example of such support is schematically represented in FIG. 1, wherein two swivelling pad arms are indicated with 1 and they are each provided with a respective adaptive elastic member, i.e. capable of adapting—by configuration, shape and properties—to operative variations, and whose configuration represents the innovative and distinctive feature of the invention.

Referring with greater detail to FIG. 2, each adaptive elastic member consists in a three-dimensional monolithic metallic body 2, for example generally parallelepiped-shaped, obtained through an additive manufacturing method and having a flexural orthotropic behaviour.

More in particular, the monolithic metallic body 2 has variable density and inertia along the sections thereof and an elastic bi-stable linear behaviour initially with low stiffness under initial deformation and subsequently with high stiffness. To this end, the monolithic metallic body 2 comprises a plurality of plate-like elements 3 arranged in a superimposed and interconnected layer-like fashion by means of intermediate spacers 4 oriented transversely to the plate-like elements 3 and arranged asymmetrically. The top and bottom plate-like elements 3 are configured to be respectively arranged at contact with the swivelling pad arm 1 and with the airborne load, for example consisting of an auxiliary fuel tank (not illustrated).

Figure 3:
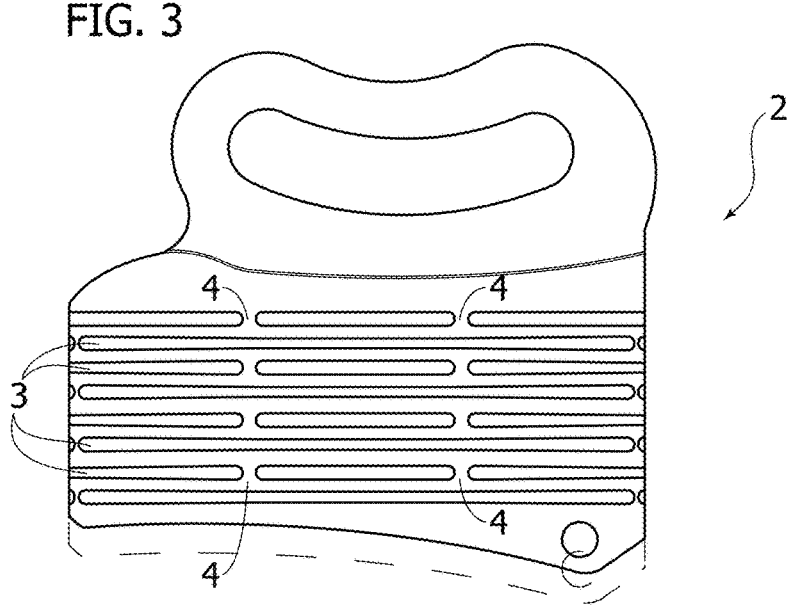
FIGS. 3, 4 and 5 are elevational schematic views showing the monolithic metallic element of FIG. 2 in three different functional situations.
Figure 4:
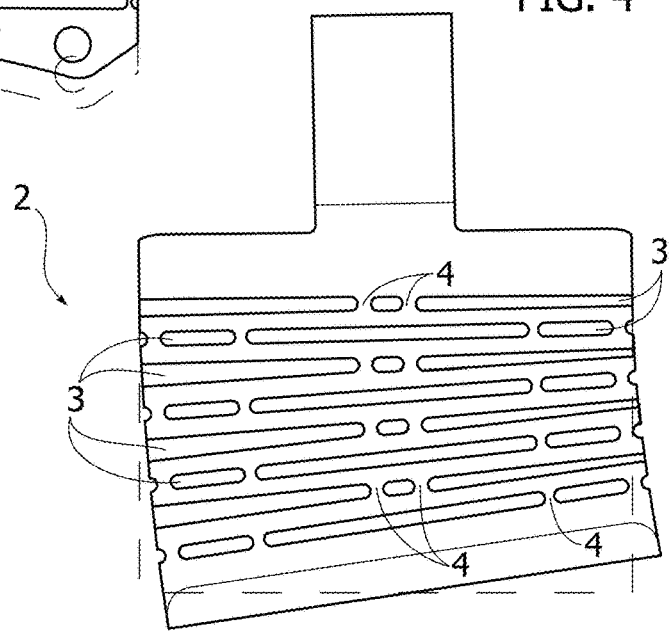
Figure 5:
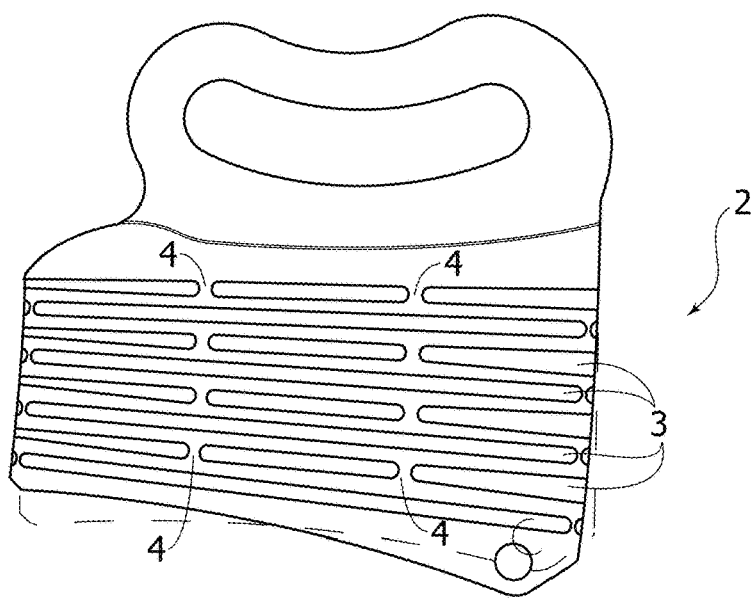

Thanks to such configuration, the monolithic metallic body 2 is capable, in use, to elastically deform in at least one of the manners schematised in FIGS. 3-5: pure compression in FIG. 3, transversal bending in FIG. 4, longitudinal bending in FIG. 5.

This allows the load suspended on the swivelling pad arms 1 to nullify possible misalignments or geometric irregularities, guaranteeing uniform pressure on the entire contact surface and the required structural stiffness at the same time.

The number of superimposed layers 3 and the number and arrangement of the relative spacers 4 may vary as a function of the required elasticity characteristics depending on the load suspended on the swivelling pad 1, still so as to maintain the stress values within the elastic field, and thus avoid plastic deformations. Basically, each layer 3 of the monolithic metallic body 2 is capable of bending between the supports consisting of the spacers 4, up to coming into contact with the subsequent layer. Beyond a given threshold value, the layers 3 act at direct contact and thus the structure behaves like a stiff element.

Dampers made of elastomeric material can be provided for between the plate-like elements 3, and the monolithic metallic body 2 can consist of a central hole (not shown in the drawings) dimensioned to obtain a linear bending behaviour and allow the insertion of an elastomer should one intend to combine the flexibility of the metallic body with a high hysteresis behaviour, so as to guarantee a given damping degree too.

Figure 6:
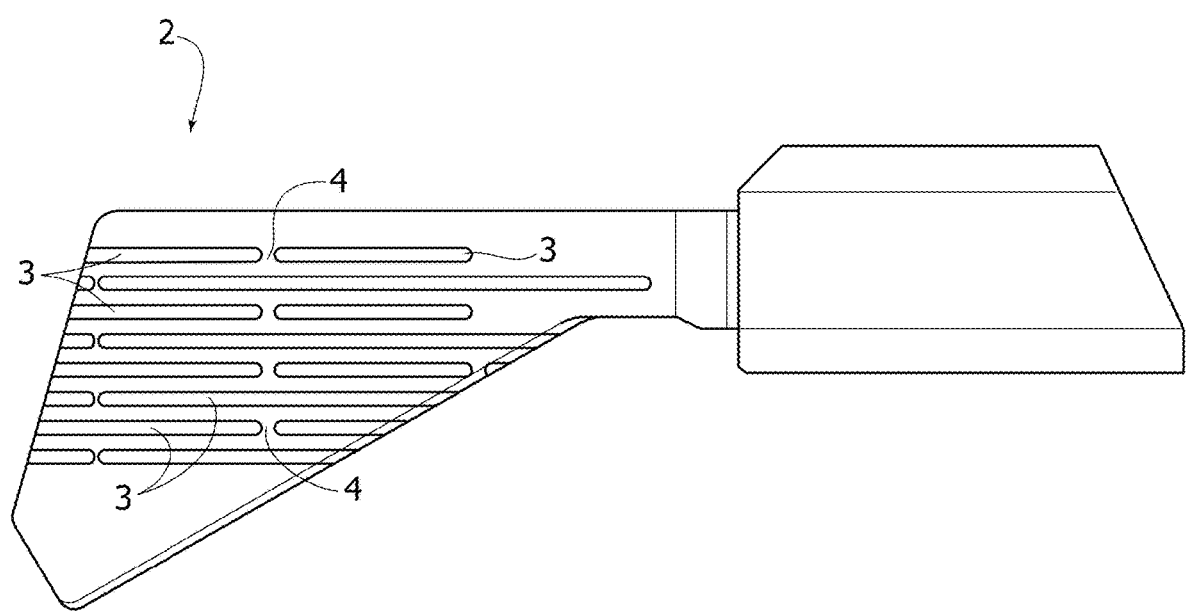
FIG. 6 is an elevational schematic view of a variant of the monolithic metallic element.

FIG. 6 shows an application example in which the monolithic metallic body 2 according to the invention has a wedge-like configuration, with which the direction of application of loads and displacements can be diverted in a per se known manner. Basically, the wedge-shaped body is preloaded in a seat thereof by applying a horizontal load, which produces a vertical component. The force with which the wedge is preloaded determines an elastic deformation of the monolithic metallic body 2.

Experimental tests conducted by the applicant confirmed that the use of the monolithic metallic body 2 according to the invention produces the effects and advantages listed below:

- capacity to adapt the stiffness and robustness characteristics to the strongly dynamic variations of the load conditions,
- consistency of the applied preload and distribution of such preload on a surface with width appropriate to the containment of the associated stress,
- contrasting any preload excesses as well as temporary cold welding and gapping events on the onset between the surfaces at contact subjected to strong dynamic loads,
- adaptability to the receiving contact surface, even in presence of geometric discontinuity or variable load conditions (for example vibration-induced displacements);
- resonance frequency that is relatively low and that can be modified at the design stage in any case, such to decouple the dynamic of the aircraft from that of the external load;
- behaviour that is strongly bi-stable, linear elastic at low stiffness in the first deformation section, linear elastic with high stiffness in the subsequent loading steps;
- high hysteresis behaviour, by introducing a rubbery material, with damping function, between the layers of the body,
- small overall dimension, lightness and relatively easy and cost-effective manufacturing thanks to the use of the additive manufacturing method.

Obviously, the construction details and the embodiments may widely vary with respect to what has been described and illustrated, without departing from the scope of protection of the present invention as defined in the claims that follow.

What is claimed is:

1. A restrain and release mechanism for an externally airborne load, comprising:
   at least one stiff support for suspending the load;
   an elastically deformable adaptive member designed to maintain the load at pressure contact against the support, said adaptive member consisting of a three-dimensional monolithic metallic body obtained using an additive manufacturing method; said monolithic metallic body comprises a plurality of plate-like elements superimposed and interconnected by means of intermediate spacers oriented transversely with respect to the plate-like elements;
   a top plate-like element of said plate-like elements contacting said stiff support and a bottom plate-like element of said plate-like elements configured to contact a load;
   a third plate-like element of said plate-like elements located between said top plate-like element and said bottom plate-like element, and
   said plurality of plate-like elements superimposed on each other and having longitudinal dimensions aligned transversely relative to an axis between said top plate-like element and said bottom plate-like element.

2. The restraint and release mechanism according to claim 1, wherein said monolithic metallic body has a flexural orthotropic behaviour.

3. The restraint and release mechanism according to claim 2, wherein said monolithic metallic body has variable density and inertia along sections thereof.

4. The restraint and release mechanism according to claim 1, wherein said monolithic metallic body has an elastic bi-stable linear behaviour initially with low stiffness under an initial deformation and subsequently with high stiffness.

5. The restraint and release mechanism according to claim 1, wherein said intermediate spacers are arranged asymmetrically.

6. A system for constraining an external load for use in the aeronautical and aerospace industries, comprising the restrain and release mechanism according to claim 1.

7. The system according to claim 6, wherein said at least one stiff support consists of a pad arm.

8. The system according to claim 7, wherein said monolithic metallic body has a generally parallelepiped configuration.

9. The system according to claim 8, wherein said monolithic metallic body has a generally wedge-like configuration.

10. The system according to claim 6, wherein said monolithic metallic body has a flexural orthotropic behaviour.

11. The system according to claim 6, wherein said monolithic metallic body has variable density and inertia along sections thereof.

12. The system according to claim 6, wherein said monolithic metallic body has an elastic bi-stable linear behaviour initially with low stiffness under an initial deformation and subsequently with high stiffness.

13. The system according to claim 6, wherein said intermediate spacers are oriented transversely with respect to the plate-like elements.

14. The system according to claim 13, wherein said intermediate spacers are arranged asymmetrically.

* * * * *